United States Patent

[11] 3,626,423

[72] Inventor Tore Ameen
Solna, Sweden
[21] Appl. No. 830,317
[22] Filed June 4, 1969
[45] Patented Dec. 7, 1971
[73] Assignee Svenska Dataregister AB
Solna, Sweden

[54] DEVICE FOR RECORDING INFORMATION ON A DATA RECORD
4 Claims, 2 Drawing Figs.

[52] U.S. Cl. ........ 346/107 R, 95/1.1, 355/1
[51] Int. Cl. ........ G06k 15/12
[50] Field of Search ........ 346/107, 108; 95/1.1, 4.5; 355;1/

[56] References Cited

UNITED STATES PATENTS

| | | | |
|---|---|---|---|
| 1,584,296 | 5/1926 | Hohmann | 95/1.1 |
| 2,322,602 | 6/1943 | Terry | 95/4.5 |
| 2,490,338 | 12/1949 | Marin et al. | 95/1.1 |
| 3,116,963 | 1/1964 | Kiyasu et al. | 346/107 |
| 3,401,398 | 9/1968 | Lichtenstein | 346/107 |
| 3,403,263 | 9/1968 | Hargens | 250/202 |
| 3,458,655 | 9/1969 | Thourson | 95/4.5 X |
| 1,787,940 | 1/1931 | Garbutt | 346/108 |
| 2,425,122 | 8/1947 | Petty et al. | 178/15 X |
| 2,721,782 | 10/1955 | Uilbig | 346/107 |

*Primary Examiner*—Joseph W. Hartary
*Attorneys*—Norman Friedman, Morris I. Pollack, Arthur T. Groeninger, Stephen E. Feldman and Philip Furgang

ABSTRACT: A plurality of light-conducting rods are disposed with one end of each rod arranged in a parallel line in close proximity a continuous sheet of light-responsive recording medium. The other ends of the rods are disposed for coaction with light sources adapted to be energized, in coded combinations, upon actuation of the keys of a keyboard. The appearance of light at the end of the rods results in the recording of machine-readable longish lines on the light-responsive medium which is thereafter severed in labellike sections. A plurality of apertured wheels are also disposed in proximity to the light-responsive medium and for cooperation with a light source to facilitate the recording of visual figures on the medium.

DEVICE FOR RECORDING INFORMATION ON A DATA RECORD

BACKGROUND OF THE INVENTION

The present invention relates broadly to a device for recording information on a data record. More specifically, the invention refers to a device for producing information in the form of longish, parallel areas which according to a predetermined combination are intended to be recorded on varying distances from each other upon a light-sensitive data record during relative movement between the device and the data record.

In the retail business, for instance, data records in the form of price labels being fastened to the goods are used. The price labels are generally read electrically at the selling place and the electrical signals obtained are forwarded to a cash register where they are registered in a suitable manner and may be further treated in a data-collecting system for instance with cash accounts, stock-accounting and salary provisions.

In order to obtain swift and careful reading of a price label the information stored on the label must be recorded in such a manner that the reading device and the label need not be carefully placed in relation to each other. It has therefore been suggested to manufacture labels on which information is stored in the form of longish, parallel areas. Due to the width of these areas (in the reading direction) being much less than their length (perpendicular to the reading direction) the reading device, which reads the areas in series, does not need to be carefully oriented in relation to the label. The longish, parallel areas consist of black stripes extending in the length direction over the whole width of the label and are placed on varying distances from each other. The width of the stripes and the distances between the stripes are determined by the selected code and by the information according to the selected code with which the label shall be recorded.

When manufacturing the above-mentioned labels metal stencils, the slots of which are located at certain determined distances from each other, have been used previously in order to represent the price of the article in code form. These stencils, which have also been provided with notches which state the price of the article in text en clair, have thereupon been laid over a light-sensitive paper and illuminated, whereafter, at a following development, longish areas and text en clair have appeared on the areas of the paper over which the slots and the notches respectively were place. Stencils have also been used which in code form and text en clair represent only one figure, and several stencils had to be combined in order to represent several figures, and thus the price of an article, in code form and text en clair.

The disadvantages with manufacturing labels with the help of stencils are evident. Firstly, a plurality of stencils representing different figures must be used and the excess to a certain, determined stencil among several other stencils is time wasting. Secondly, the stencils must be fairly carefully directed in relation to the labels which also is time-wasting.

SUMMARY OF THE INVENTION

The device according to the present invention is designed in such a manner that the disadvantages with the previously known devices are eliminated. Thus, light-sensitive labels, suitably forming a continuous path, are fed continuously over a station where a predetermined number of several light conductors emit light to the labels on which a combination of code marks in the form of longish, dark areas appear upon development. The light conductors which shall emit light to the labels are optically connected to lamps which are illuminated when depressing keys on a keyboard.

Other advantages with and objects of the present invention are evident from the following detailed specification in connection with the enclosed drawings on which:

DESCRIPTION OF THE PREFERRED EMBODIMENT

Figures 1, 2:
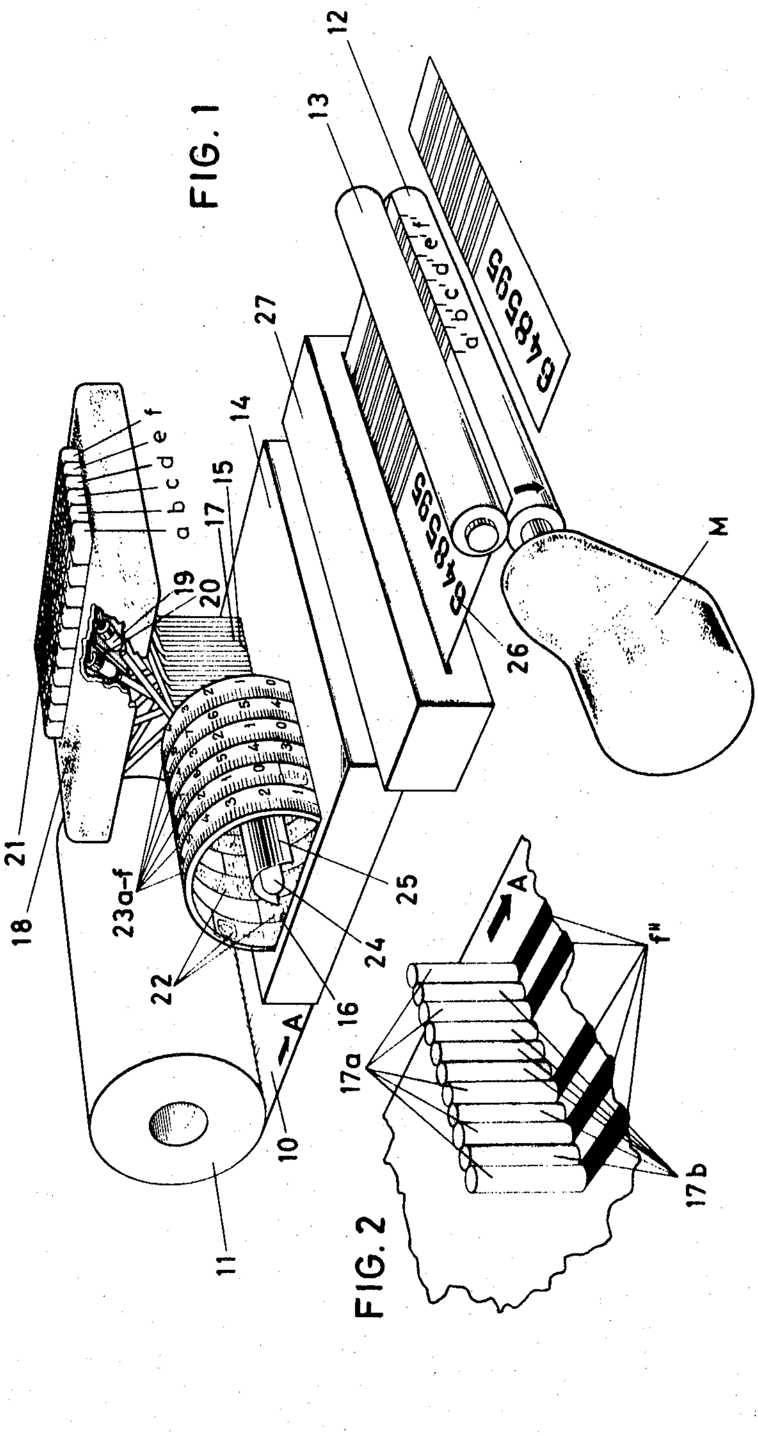
FIG. 1 is a schematic perspective view of the device according to the invention.
FIG. 2 is a schematic perspective view of details of the device according to figure 1.

In FIG. 1 is schematically shown the device according to the invention where the reference symbol 10 designates a light-sensitive paper slip which, from a storing roll 11, by a feed roller 12 and a pressure roller 13 driven by a motor M, is fed through the place in the device where the paper slip will be recorded with information. Over and in intimate contact with the slip 10 a body 14, which cannot transmit light, is positioned. There is a slit 15 in the body 14 and also a large recess 16. In the slit 15 several light conductors 17, such as glass fibers, are positioned and fastened so that their ends facing the slip 10 are flush with the lower surface of the body 14 and thereby contact the slip. Within and a bit over the slit 15, which is evident from FIG. 2, the light conductors 17 contact each other and form a row which is generally perpendicular to the feeding direction (arrow A) of the slip 10. In their ends which are turned from the slip 10 the light conductors 17 are spaced from each other and entered into a keyboard 18. The keyboard 18 contains lamps 19 (two are shown in FIG. 1) and one lamp is placed in front of each light conductors 17 end in the keyboard. Lamps 19 with belonging ends of the light conductors 17 are shielded from each other (such as at 20), and energization of a lamp can not cause that a light conductor belonging to another lamp is supplied with light. Each of a plurality of keys 21 on the keyboard 18 energizes one or several lamps 19 upon depression. Each key 21 represents a figure which in code form shall be recorded on the light-sensitive paper slip 10. Keys 21 are in the shown embodiment arranged in six key rows *a–f* and each key row comprises ten keys which designate FIGS. 0–9. Each key row *a–f* thus represents one figure position so that a number consisting of six figures can be recorded on the slip 10. For instance, upon depression of a key 21 which is designated "3" in the key row *b*, a combination of lamps 19 is energized and the lamps emit light through their belonging light conductors 17, to column $B^1$ on slip 10. As a result the corresponding combination longish code areas will be recorded on the slip when fed in the direction of arrow A. Multipolar switches or diode gates (not shown) in the keyboard 18 guarantee that the correct combination of lamps 19 is energized upon depression of a key 21.

Each column $a^1$–$f^1$ on the slip 10 as mentioned above, receives a combination of longish code areas representing a figure. The width of the code areas and the mutual distances between the code areas within each column $a^1$–$f^1$ decide which figure will be represented. It is evident from FIG. 2 that column $f^1$ on the paper slip 10 receives a certain combination of code areas $f^{11}$ upon depression of a key 21 whereby the light conductors 17*a* but not the light conductors 17*b*, transmit light to the slip.

The recess 16 in body 14 contains a plurality of bands 22 of plate for instance, each of which is provided with ten recesses in the form of figures 0–9. Each band 22 can be moved to a position wherein a recess of a selected figure is situated just above the paper slip 10. The movement of the bands 22 can be done manually which is shown in FIG. 1.

Each band 22 is fastened to the lower part of a transparent drum's 23 *a–f* outer surface. The upper part of the outer surface of each drum 23 *a–f* is provided with figures of which only one at the time can be seen through a slit in a lightproof envelope which encloses all the drums (not shown). When the drums 23 *a–f* shall be manually set—all the drums are accessible through said slit—they are turned to positions until selected figures appear in the slit whereby also the recesses in the bands 22, which represent the selected figures, lie just above the paper slip 10.

A longish flash bulb 24 is mounted within the drums 23 *a–f*. The flash bulb 24 has a reflector 25 which directs light emitted from the bulb only to the recesses in the bands 22 which are set just above the paper slip 10. The flash bulb 24 with its reflector 25 is mounted just above the set recesses in the bands 22 and does not prevent rotation of drums 23 *a–f*. The flash bulb 24, which emits much more light than lamps 19, is energized by a switch (not shown) which is disposed on the feed roller 12. The flash bulb 24 will therefore be ignited and thereafter extinguished very swiftly at a point of time, determined by the rotation velocity of the feed roller 12. The paper slip 10 will receive light through the set recesses in bands 22 during a very short time period while the paper slip 10 is fed in the direction of arrow A. As the flash bulb 24 has a great luminosity and emits light during a short time period the figures representing recesses in bands 22 will be distinctly recorded on the slip 10 in spite of its movement.

Due to the synchronization between the feeding velocity of slip 10 and the ignition of flash bulb 24, in spite of possible variation in velocity of slip 10, registrations of the visual figures 26 following each other, produced by the recesses in bands 22, will always be recorded at the same distance from each other.

Lamps 19 and flash bulb 24 receive current from any suitable current source preferably from the electrical lighting mains.

Just near the body 14 there is a reservoir 27 which contains developer for the paper slip 10. When slip 10 is fed into the reservoir 27 through a slit in it, the areas which were previously illuminated through light conductors 17 and through the recesses in the bands 22 are developed.

Rollers 12 and 13 do not only feed the paper slip 10, but also remove developer from it.

All the above described details of the device are covered by an envelope which is lightproof (not shown). Only keys 21 of the keyboard 18 and an upper part of the periphery of drums 23 *a–f* are accessible during normal handling of the device.

After the paper slip 10 has been fed over the feed roller 12 it is cut into suitable widths (labels) by means which for instance is driven in synchronization with feed roller 12.

Though the device according to the present invention has been described in detail it is not the purpose that the invention shall be limited through this description but shall only be limited in accordance with the idea and the scope of the invention which is evident from the enclosed claims.

1. A device for recording information on a light-responsive medium comprising;

a. a keyboard including a plurality of selectively actuatable keys;

b. light source means associated with said keyboard and responsive to selection and actuation of predetermined ones of said keys to provide illumination indicative of the keys so actuated and in accordance with a predetermined code;

c. a plurality of light-conducting rods;

d. one end of each of said rods having associated therewith said light source means so that said rods may be selectively illuminated in accordance with said predetermined code;

e. the other end of each of said rods terminating in a linear array in a predetermined plane to transmit the light to said plane when so illuminated;

f. means adapted for coaction with the light-responsive medium to arrange same in juxtaposition to said other ends of each of said rods and to provide continuous relative motion between said rods and the light-responsive medium in a direction perpendicular to the linear array so that for each rod so illuminated an elongated line, representing the predetermined code, is recorded across the light-responsive medium in the direction of movement thereof;

g. figure-recording means; including a plurality of selectively settable bands each carrying an array of figures, which may be selectively set so as to present figures which correspond to the keys actuated and said predetermined code represented thereby; and h. illumination means coacting with said figure-recording means to illuminate the selectively set figures and effect recording thereof upon said light-responsive medium coincidentally with the recording thereof of said predetermined code and in such a manner that the movement of the medium does not affect the clarity of the figures so recorded.

2. The device of claim 1 wherein said light source means may be actuated in response to operation of a single key in accordance with said predetermined code.

3. The device of claim 1 wherein said other ends of said rods contact each other.

4. The device of claim 1 wherein said illuminating means consists of a longish lamp adapted to illuminate a plurality of bands at a time.

* * * * *